United States Patent
Xu et al.

(10) Patent No.: US 10,467,742 B2
(45) Date of Patent: Nov. 5, 2019

(54) METHOD AND IMAGE CAPTURING DEVICE FOR DETECTING FOG IN A SCENE

(71) Applicant: Axis AB, Lund (SE)

(72) Inventors: Can Xu, Lund (SE); Per Wilhelmsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/168,834

(22) Filed: Oct. 24, 2018

(65) Prior Publication Data
US 2019/0122355 A1    Apr. 25, 2019

(30) Foreign Application Priority Data
Oct. 24, 2017    (EP) ..................................... 17197933

(51) Int. Cl.
| | |
|---|---|
| *G06T 7/00* | (2017.01) |
| *H04N 5/235* | (2006.01) |
| *H04N 5/225* | (2006.01) |
| *G06K 9/00* | (2006.01) |
| *G06K 9/20* | (2006.01) |

(52) U.S. Cl.
CPC ........ *G06T 7/0002* (2013.01); *G06K 9/00771* (2013.01); *G06K 9/00791* (2013.01); *G06K 9/2018* (2013.01); *H04N 5/2256* (2013.01); *H04N 5/2351* (2013.01); *G06T 2207/10048* (2013.01); *G06T 2207/10152* (2013.01); *G06T 2207/30168* (2013.01); *G06T 2207/30192* (2013.01)

(58) Field of Classification Search
CPC ........... G06K 9/00771; G06K 9/00791; G06K 9/2018; G06T 2207/10048; G06T 2207/10152; G06T 2207/30168; G06T 2207/30192; G06T 7/0002; H04N 5/2256; H04N 5/2351
See application file for complete search history.

(56) References Cited

U.S. PATENT DOCUMENTS

2009/0046894 A1    2/2009 Robert et al.

FOREIGN PATENT DOCUMENTS

CN    102539385 A    7/2012

OTHER PUBLICATIONS

"Seeing through fog and rain with a thermal imaging camera." https://web.archive.org/web/20150320151655/https://www.flirmedia.com/MMC/CVS/Tech_Notes/TN_0001_EN.pdf. Mar. 20 2015. (Year: 2015).*

(Continued)

*Primary Examiner* — Farzana Hossain
(74) *Attorney, Agent, or Firm* — Xsensus LLP

(57) ABSTRACT

An image capturing device captures a first image of the scene without illuminating the scene with IR radiation. The image capturing device determines a first value of a measure relating to contrast for the first image. When the first value indicates that a first contrast of the first image less than a first threshold value, the image capturing device captures a second image of the scene while illuminating the scene with IR radiation. The image capturing device determines a second value of the measure relating to contrast for the second image. When a difference between the first contrast and a second contrast, indicated by the second value, is greater than a second threshold value, the image capturing device determines that there is fog in the scene. A computer program and a computer program carrier are also disclosed.

7 Claims, 4 Drawing Sheets

(56) References Cited

OTHER PUBLICATIONS

Narasimhan, S.G. and Nayar, S.K., "Contrast Restoration of Weather Degraded Images," IEEE Transactions on Pattern Analysis and Machine Intelligence, vol. 25, No. 6, Jun. 2003, pp. 713-724.
Pavlić, M., et al., "Image based fog detection in vehicles," 2012 Intelligent Vehicles Symposium, Alcalá de Henares, Spain, Jun. 3-7, 2012, © 2012 IEEE, pp. 1132-1137.
Extended European Search Report and Opinion for European Application No. 17197933.9 dated Apr. 26, 2018.

* cited by examiner

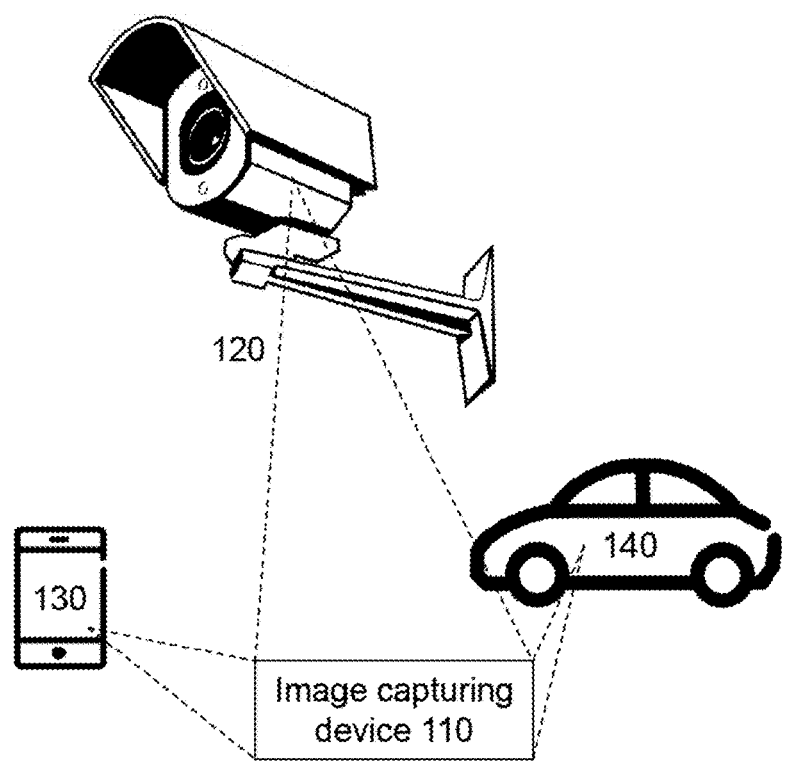
Fig. 1
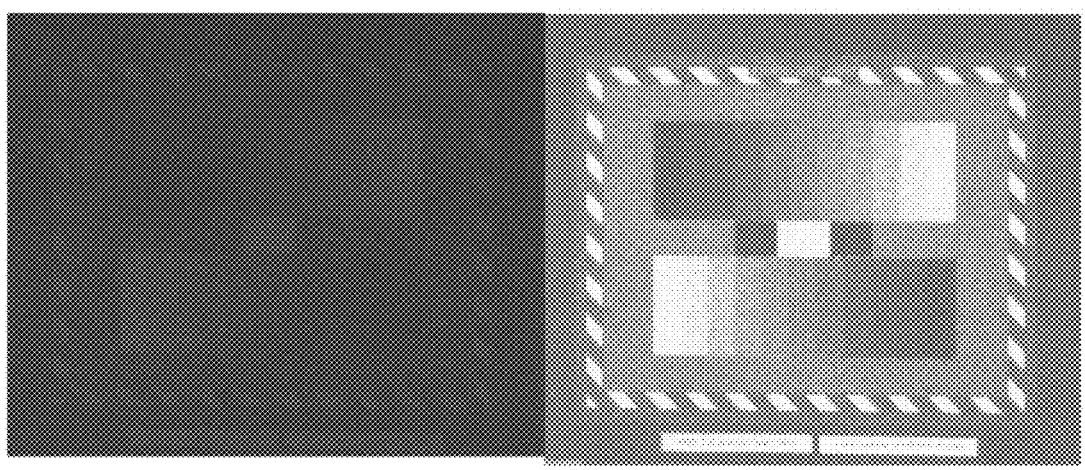
Without IR
Fig. 2a
With IR
Fig. 2b

METHOD AND IMAGE CAPTURING DEVICE FOR DETECTING FOG IN A SCENE

TECHNICAL FIELD

Embodiments herein relate to image processing, such as automatic detection, automatic classification, image enhancement and the like. In particular, a method and an image capturing device for detecting fog in a scene are disclosed. A corresponding computer program and a computer program carrier are also disclosed.

BACKGROUND

Image processing refers to any processing that is applied to an image. The processing can include application of various effects, masks, filters or the like, to the image. In this manner, the image can be enhanced in terms of contrast, converted to grey scale, or altered in some way. The image has typically been captured by a video camera, a still image camera or the like.

Weather conditions have a large impact on visibility, generally, but also for devices capturing images. Haze and fog especially give rise to unwanted stray light due to scattering. Imaging algorithms, referred herein to as "contrast enhancing processing", have been developed that attempt to enhance contrast that may be lost due to the scattering caused by e.g. fog, haze and the like.

With reference to the contrast enhancing processing, some challenges arise when it is not known whether the scene to be captured includes fog or not. Should it be assumed that fog is present and contrast enhancing processing is applied all the time, this may cause severe quality degradation to images depicting scenes which do not include fog. The contrast enhancing processing is thus of limited use when it is not known whether the weather has caused fog in the image or not. Therefore, an operator of for example a video surveillance system manually turn on contrast enhancing processing when he/she observes fog in the images captured by the video surveillance system. Disadvantageously, there is thus a risk that the operator, or another operator on duty, forgets to turn off the contrast enhancing processing when not needed anymore, e.g. when the fog is gone, or almost gone.

A problem may therefore be related to how to automatically detect whether a scene imaged by a device includes fog or not.

According to known measures, a histogram of an image of the scene may be used in order to get a hint of whether or not fog is present in the scene. Briefly, the histogram is a plot illustrating number of pixels versus a range of available pixel values of the image. Hence, when the histogram is said to be flat, i.e. relatively many of the available pixel values are represented by a similar amount of pixels, it can be assumed that there is fog in the scene. However, scenes with flat dynamics without fog will also be represented by a similar histogram, which thus will cause the known measures to erroneously assume the scene to include fog. Any subsequently applied contrast enhancing processing would thus degrade quality of the image.

CN102539385 discloses a multi-wavelength fog haze identification method and a measurement method of the visibility. With the method, a color filter is installed in front of an optical receiver in a scattering visiometer. Further, a series of red, green and blue color filters are additionally installed through the optical receiver in the visiometer. In this manner, it may be discerned whether it is fog or haze. Moreover, a absorbance index may be calculated separately according to the difference between fog and haze.

US20090046894 discloses a process for the detection from a vehicle of a visibility interference phenomenon. A beam of light is emitted to illuminate the rear of the vehicle, the beam of light being emitted into a field of vision of a camera mounted in the vehicle. Next, a presence of and the nature of a visibility interference phenomenon is determined on the basis of at least one image captured by the camera.

In article "Image based fog detection in vehicles", by PAVLIC M et al., laid open in INTELLIGENT VEHICLES SYMPOSIUM (IV), 2012 IEEE, IEEE, on 3 Jun. 2012, pages 1132-1137, XP032453047, DOI: 10.1109/1VS.2012.6232256, ISBN: 978-1-4673-2119-8, systems to detect fog in images based on contrast are disclosed. It is proposed to use image descriptors and a classification procedure in order to distinguish images with fog present from those free of fog. These image descriptors are global and describe the entire image using Gabor filters at different frequencies, scales and orientations.

In article "Contrast Restoration of Weather Degraded Images", to NARASIMHAN S G et al., laid open in IEEE TRANSACTIONS ON PATTERN ANALYSIS AND MACHINE INTELLIGENCE, IEEE COMPUTER SOCIETY, USA, vol. 25, no. 6, on 1 Jun. 2003, pages 713-724, XP001185045, ISSN: 0162-8828, DOI: 10.1109/TPAMI.2003.1201821, correlation between scattering values, presence of fog and different wavelengths, such as infrared, is explained. Images of outdoor scenes captured in bad weather suffer from poor contrast. Under bad weather conditions, the light reaching a camera is severely scattered by the atmosphere. The resulting decay in contrast varies across the scene and is exponential in the depths of scene points. There is proposed a physics-based model that describes the appearances of scenes in uniform bad weather conditions. Changes in intensities of scene points under different weather conditions provide simple constraints to detect depth discontinuities in the scene and also to compute scene structure.

SUMMARY

An object may be to how to solve, or at least partly solve, the above mentioned problem while reducing shortcomings of the known measures.

According to an aspect, the object is achieved by a method, performed by an image capturing device, for detecting fog in a scene imaged using the image capturing device are disclosed. The image capturing device captures a first image of the scene without illuminating the scene with IR radiation. The image capturing device determines a first value of a measure relating to contrast for the first image. When the first value indicates that a first contrast of the first image less than a first threshold value, the image capturing device captures a second image of the scene while illuminating the scene with IR radiation. The image capturing device determines a second value of the measure relating to contrast for the second image. When a difference between the first contrast and a second contrast, indicated by the second value, is greater than a second threshold value, the image capturing device determines that there is fog in the scene.

According to another aspect, the object is achieved by an image capturing device configured for performing the method above.

According to further aspects, the object is achieved by a computer program and a computer program carrier corresponding to the aspects above.

The image capturing device determines the second value of the measure relating to contrast for the second image, which is captured while illuminating the scene with IR radiation. In this manner, the image capturing device may obtain the second contrast of the second image, whereby additional information of the scene when illuminated by IR radiation has been gathered. The image capturing device may then compare the difference between the first and second contrasts to the second threshold value in order to determine whether or not there is fog in the scene. Hence, thanks to the comparison of the difference to the second threshold, the image capturing device may be able to determine that there is fog in the scene when the difference is greater than the second threshold value and that there is no fog, or at least no detectable amounts of fogs, in the scene when the difference is less than the second threshold value.

The measure relating to contrast of an image may be represented by a histogram, a ratio between maximum pixel count and minimum pixel count of the histogram, a sharpness of edges, a ratio of local maximum and minimum values, a so called Sobel filter for edge detection, any other suitable filter for edge detection or the like. The measure may further be represented by any quantity, determined based on an image, for the purpose of autofocus and/or contrast evaluation.

An advantage is thus that the embodiments herein enable improvement of image quality, such as contrast, or the like, even under varying whether conditions, e.g. no fog, with fog, since the embodiments herein provide automatic detection of fog. The improvement of the image quality is enabled thanks to that selection of whether or not to apply contrast enhancing processing or capturing of images with IR illumination may be based on whether or not fog is present as determined by the embodiment herein.

BRIEF DESCRIPTION OF THE DRAWINGS

The various aspects of embodiments disclosed herein, including particular features and advantages thereof, will be readily understood from the following detailed description and the accompanying drawings, in which:

FIG. 1 is a schematic overview illustrating exemplifying embodiments herein,

FIG. 2a and FIG. 2b are exemplifying images without IR and with IR, respectively.

DETAILED DESCRIPTION

Figure 3:
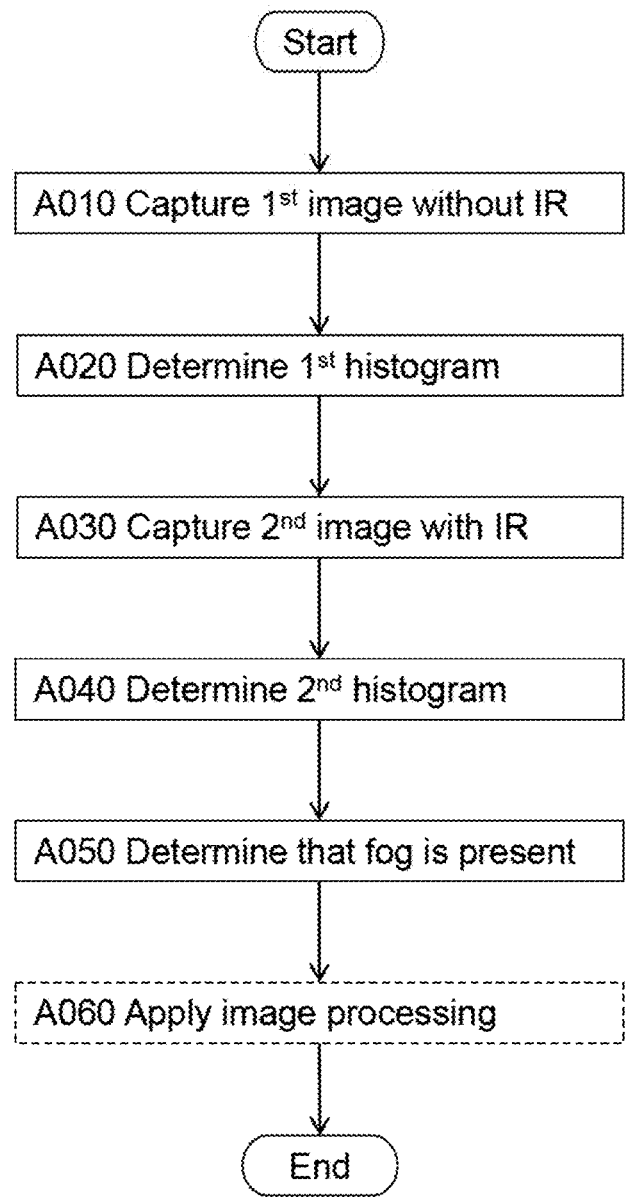
FIG. 3 is a flowchart illustrating embodiments of the method in an image capturing device.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying image capturing device 110, such as a video recorder, a surveillance camera 120, a digital camera, a smartphone 130 including an image sensor, a car 140 including an image sensor, a wired or wireless device capable of obtaining images over a network or the like. The image capturing device 110 may be comprised in the surveillance camera 120, the smartphone 130, the car 140 or the like.

Thus, the image capturing device 110 is capable of processing an image. The image may have been captured by the image capturing device 110 itself or it may have been received from another device, which captured the image, or from a memory, such as hard drive or the like.

The image capturing device 110 is described in more detail with reference to FIG. 5 below. However, in order to provide some definitions and context for the description relating to FIG. 3 below, it may be noted that the image capturing device 110 may comprise an image sensor for capturing images. The image sensor may be a Complementary Metal-Oxide-Semiconductor (CMOS) sensor, Charge-Coupled Device (CCD) sensor or the like. The image capturing device 110 may comprise an IR radiation source for emitting IR radiation. The IR radiation source may be an infrared Light Emitting Diode (LED), an IR light source, an IR illumination laser diode, black-body radiator such as halogen lamp, sodium lamp, gas discharge lamp, or the like.

Furthermore, the image capturing device 110 may comprise an IR-cut filter for cutting IR radiation, or IR light. The IR-cut filter is movable between a first position and a second position. The IR-cut filter may be an interference filter, reflective filter, absorbing filter, hybrid reflective and absorbing filter, or the like. When the IR-cut filter is in the first position, IR radiation is prevented from reaching the image sensor. This may mean that the first position causes IR radiation incident towards the image sensor to be cut away, by the IR-cut filter, before reaching the image sensor. When the IR-cut filter is in the second position, IR radiation is allowed to fall onto the image sensor.

In order to illustrate impact of fog, FIG. 2a illustrates an exemplifying image of a scene including fog, e.g. compromised by the fog. The exemplifying image is captured without use of the IR radiation source of the image capturing device 110. While it may be difficult to distinguish in the reproduced FIG. 2a, it is here explained what is shown. FIG. 2a depicts a pattern of rectangles, surrounded by a striped line. The pattern is obscured by fog and is thus barely visible in FIG. 2a.

FIG. 2b illustrates a further exemplifying image of the same scene as in FIG. 2a. This means that the scene also in FIG. 2b includes fog. However, the further exemplifying image is captured while the scene is illuminated by the IR radiation source of the image capturing device 110. The further exemplifying image shows the rectangles and the surrounding striped line more clearly thanks to the illumination by the IR radiation source. In this manner, the image capturing device 110 sees through the fog by use of IR, since the IR radiation becomes less scattered, or dispersed, than visible light due to that wavelengths of IR radiation is longer than wavelengths of visible light.

Now turning to FIG. 3, there is illustrated an exemplifying method according to embodiments herein when implemented in the image capturing device 110 of FIG. 1.

The image capturing device 110 performs a method for detecting fog in a scene imaged using the image capturing device 110.

One or more of the following actions may be performed in any suitable order.

Action A010

In order to obtain some initial information about the scene, the image capturing device 110 captures a first image of the scene without illuminating the scene with IR radiation.

The capturing A010 of the first image may be performed with the IR-cut filter in the first position, i.e. IR radiation incident towards the image sensor of the image capturing device 110 is cut away before reaching the image sensor.

Furthermore, since the scene is not illuminated by IR radiation, the IR radiation source may be switched off when the first image is captured. Expressed differently, the IR radiation source may be switched off during the capturing A010 of the first image.

Action A020

In order to obtain a first contrast, the image capturing device 110 determines a first value of a measure relating to contrast for the first image. The first contrast may be a first contrast value representing contrast of the first image. This may mean that the image capturing device 110 may determine, such as calculate, a representation of the measure relating to contrast, where the representation may be one or more values, one or more vectors, one or more matrices or the like. Accordingly, the representation, or the value for short, provides information about contrast of the first image, or generally any image, as a quantity under observation for the purpose of determining whether or not fog is present in the scene.

As previously mentioned, the measure relating to contrast of an image may be represented by a histogram, a ratio between maximum pixel count and minimum pixel count of the histogram, a sharpness of edges, a ratio of local maximum and minimum values, a so called Sobel filter for edge detection, any other suitable filter for edge detection or the like. The measure may further be represented by any quantity, determined based on an image, for the purpose of autofocus and/or contrast evaluation.

As used herein the term "value" may refer to a graph of the measure, a vector of the measure, one or more values of the measure or the like.

In one illustrative example, the first value of the measure may be a first histogram, e.g. a first graph representing a histogram derived from the first image. Reference is made to FIG. 4b, in which the dotted line may represent an example of the first histogram.

In more detail, the first contrast may be determined, such as calculated, as a ratio between maximum pixel count and minimum pixel count of the first histogram. Any other known measure indicating contrast may be used. Again, exemplifying measures are for example, the sharpness of edges in scene, ratio of a local maximum and minimum values within a scene, or the like.

Action A030

When the first value indicates that the first contrast of the first image less than a first threshold value, the image capturing device 110 captures a second image of the scene while illuminating the scene with IR radiation. In this manner, the image capturing device 110 makes an initial assumption that there is fog, but proceeds with further investigation to confirm the initial assumption.

With reference to the previously mentioned illustrative example, action A030 may mean that the image capturing device 110 captures the second image of the scene while illuminating the scene with IR radiation, when the first histogram indicates that the first contrast of the first image is less than the first threshold value.

The first threshold value may indicate a contrast at which the first image is suspected to be compromised by fog. Thus, when the first contrast is less than the first threshold value, the image capturing device 110 may interpret this as that the scene may be compromised by fog and the further investigation may be needed such as to ensure that there is in fact fog. At this stage, it is not clear whether the scene has a flat dynamics, i.e. low contrast or similar, or the scene is actually exposed to fog.

The capturing A030 of the second image may be performed with the IR-cut filter in the second position, i.e. IR radiation is allowed to fall onto the image sensor.

Furthermore, in order to illuminate the scene with IR radiation, the IR radiation source may be switched on when the second image is captured. Expressed differently, the IR radiation source may be switched on during the capturing A030 of the second image.

Action A040

Similarly to action A020 above, in order to obtain a second contrast, the image capturing device 110 determines a second value of the measure relating to contrast for the second image. The second contrast may be a second contrast value representing contrast of the second image.

With reference to the previously mentioned illustrative example, the second value of the measure may be a second histogram. Reference is again made to FIG. 4b, in which the solid line may represent an example of the second histogram.

In more detail, the second contrast may be determined, such as calculated, as a ratio between maximum pixel count and minimum pixel count of the second histogram. As mentioned above any other known measure indicating contrast may be used.

Action A050

When a difference between the first contrast and the second contrast, indicated by the second value as described in action A040, is greater than a second threshold value, the image capturing device 110 determines that there is fog in the scene.

The second threshold value may indicate difference in contrast expected due to IR radiation. Thus, when the difference is greater than the second threshold value, the image capturing device 110 may interpret this as that the scene may indeed be compromised by fog. Consequently, the initial assumption is confirmed.

With reference to the previously mentioned illustrative example, action A050 may mean that the image capturing device 110 determines that there is fog in the scene, when a difference between the first contrast and the second contrast, being based on the second histogram, is greater the second threshold value.

As a first example, the image processing device 110 may determine, such as calculate or the like, the difference as the first contrast reduced by the second contrast. The first example may be preceded by a normalization of the first and second contrasts according to any suitable measure.

As a second example, the image processing device 110 may determine, such as calculate or the like, the difference as the first contrast divided by the second contrast. The second example may be preceded by a normalization of the first and second histograms to obtain a suitable and comparable measure.

As a third example, the image processing device 110 may determine, such as calculate or the like, the difference based on sharpness of the first and second images. The third example may determine the sharpness by looking for sharp edges and computing their corresponding point-spread function, or it may be determined through the use of suitable filters, such as a Sobel filter or the like.

Action A060

When the image capturing device 110 has determined that there is fog in the scene, the image capturing device 110 may apply image processing, such as contrast enhancing processing, and/or the image capturing device 110 may decide to capture images while illuminating the scene with IR radiation. This means that the image capturing device 110 may automatically turn on or off the contrast enhancing processing based on whether or not fog is present in the scene captured in the first and second images.

When contrast enhancing processing is applied, the difference may be used as input to the algorithm, performing the contrast enhancing processing, in order to control how heavily or hard the contrast enhancing processing is to be applied to images, such as the first image.

Accordingly, with the embodiments according to action A060, image quality may be improved when the image capturing device 110 has determined that there is fog in the scene, e.g. without any manual input concerning whether or not the scene is compromised or not compromised by fog.

In examples where the image capturing device 110 may have decided to capture images while illuminating the scene with IR radiation, an advantage may be that signal to noise ratio of the captured images may be increased. A reason for this may be, as mentioned above, that the IR radiation, with wavelengths longer than wavelengths of visible light, will be scattered less. Less scattering implies less noise. Hence, signal to noise ratio may be increased.

Furthermore, some or all of actions A010 through A050 may be performed repeatedly at irregular or regular time intervals or as triggered by an event in order to allow the image capturing device 110 to turn off the contrast enhancing processing when it is determined that the scene includes no fog and in order to allow the image capturing device 110 to turn on the contrast enhancing processing when it is determined that the scene includes fog. The event may be that the image capturing device 110 detects that the contrast enhancing processing appears to worsen image quality.

Figure 4A:
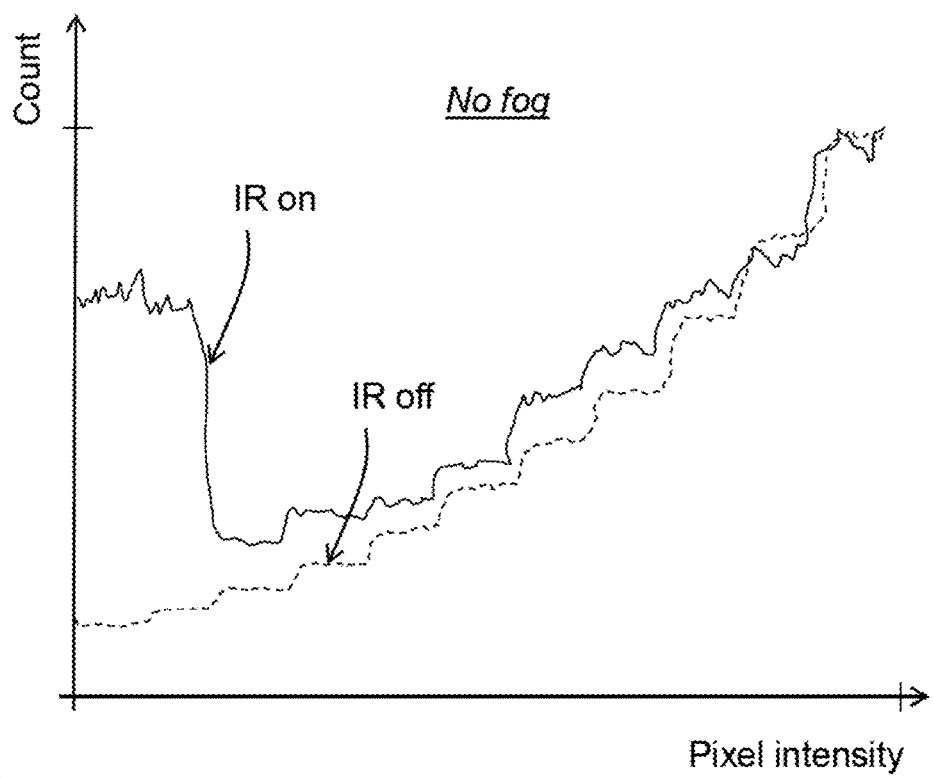
FIG. 4a and FIG. 4b are diagrams illustrating histograms without fog in the scene and with fog in the scene, respectively.
Figure 4B:
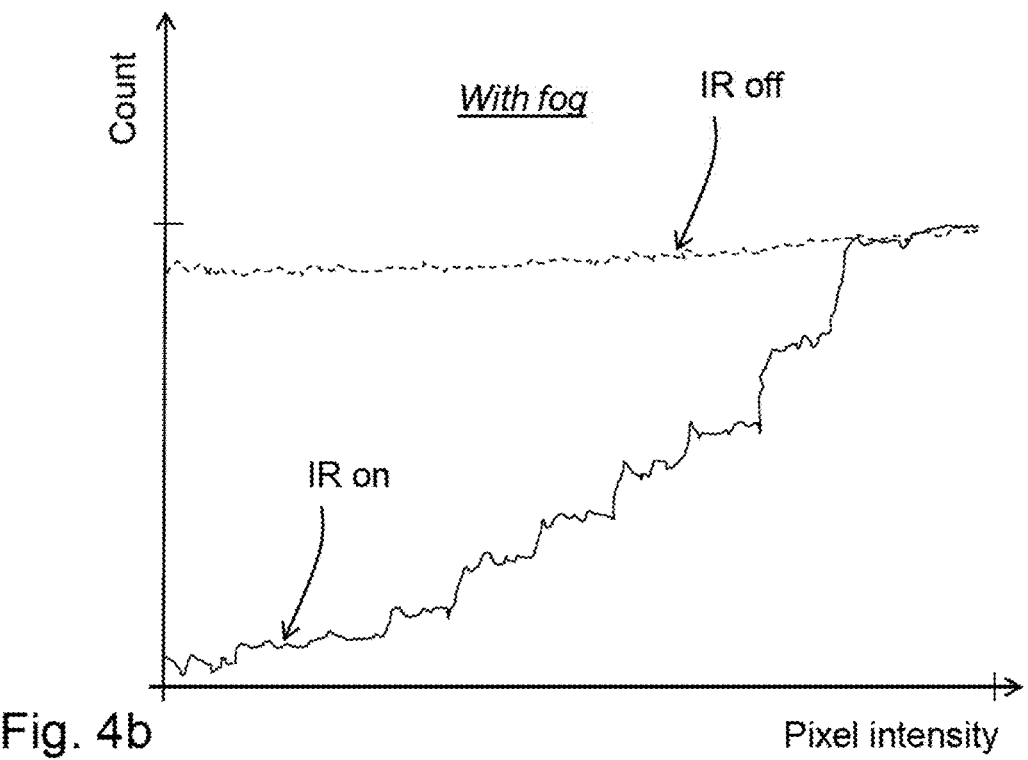

FIG. 4a and FIG. 4b illustrate histograms of images without fog and histograms of images with fog, respectively. All histograms have been normalized against their respective maximum values, i.e. maximum pixel count, in order to better highlight difference in contrast between the histograms. In this context, it shall be said that slope of a histogram graph may be considered to be an indication of contrast.

FIG. 4a illustrates a first histogram, plotted with dotted line, and a second histogram, plotted with solid line, relating to a first scene without fog.

The first histogram is obtained from a first image captured when the first scene was not exposed to IR radiation. The second histogram is obtained from a second image captured when the first scene was exposed to IR radiation.

Contrast may be measured in various manners. As an example, a ratio between maximal count and minimal count of pixels may be used to compare contrast in the first and second image.

As can be seen from FIG. 4a, a difference between contrast in the first and second images is only marginal. Thus, it can be deduced that no fog is present in the first scene captured by the first and second images. Additionally, none of the first or second histograms is flat, which also is an indication of that no fog is present in the first scene.

FIG. 4b also illustrates a first histogram, plotted with dotted line, and a second histogram, plotted with solid line, relating to a second scene with fog.

The first histogram is obtained from a first image captured when the second scene was not exposed to IR radiation. The second histogram is obtained from a second image when the second scene was exposed to IR radiation.

Again, contrast may for example be measured as a ratio between maximal count and minimal count of pixels in the first and second histograms related to the first and second images.

As can be seen from FIG. 4b, a difference between contrast in the first and second images is quite significant. Thus, it can be deduced that fog is present in the second scene captured by the first and second images.

Hence, as given by the embodiments herein, the determination of whether or not fog is present in the scene may include two main actions.

A first action may be to evaluate whether or not an image of a scene, i.e. the first image, has low contrast. If the contrast is low, this may be interpreted as a first indication of that there is fog in the scene of the image.

As a second action may be to—in order to confirm the first indication that there is fog in the scene according to the first action—capture a further image, i.e. the second image, and when contrast obtained from the first and second image differs more than the second threshold value, it may be deduced that there is fog in scene. Should the scene generate an image with flat dynamics, there would be only a marginal difference in contrast between the first and second images. On the contrary, the first indication is confirmed when the difference in contrast between the first and second image is greater than the second threshold.

Figure 5:
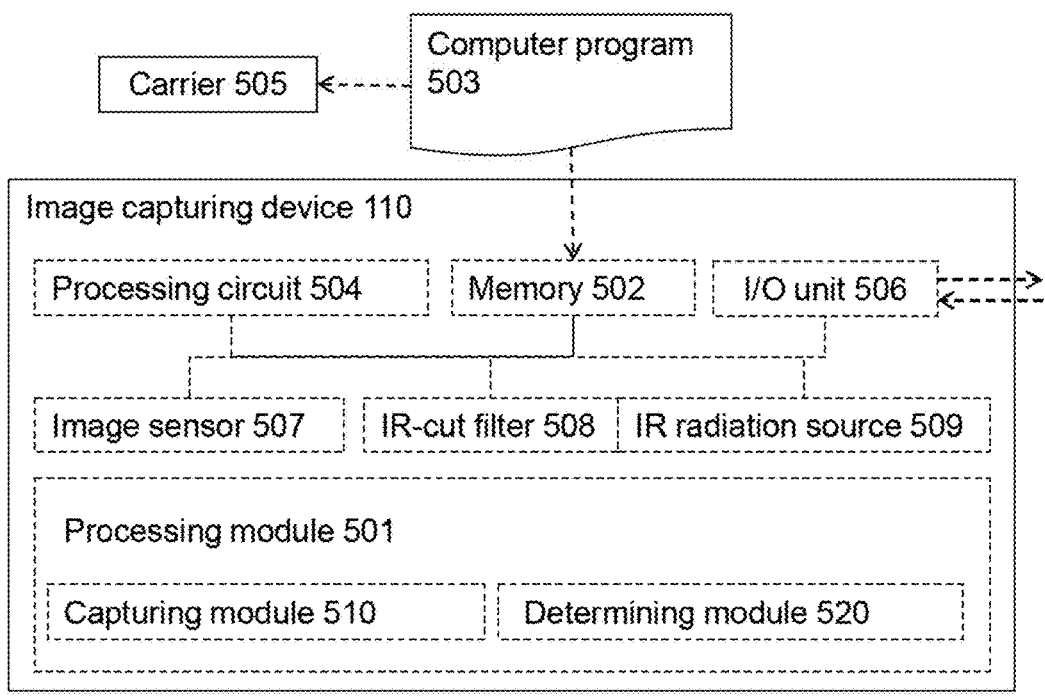
FIG. 5 is a block diagram illustrating embodiments of the image capturing device.

With reference to FIG. 5, a schematic block diagram of embodiments of the image capturing device 110 of FIG. 1 is shown.

The image capturing device 110 may comprise a processing module 501, such as a means for performing the methods described herein. The means may be embodied in the form of one or more hardware modules and/or one or more software modules The image capturing device 110 may further comprise a memory 502. The memory may comprise, such as contain or store, instructions, e.g. in the form of a computer program 503, which may comprise computer readable code units.

According to some embodiments herein, the image capturing device 110 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the image capturing device 110 is operative to perform the methods of FIG. 3. As another example, the instructions, when executed by the image capturing device 110 and/or the processing circuit 504, may cause the image capturing device 110 to perform the method according to FIG. 3.

In view of the above, in one example, there is provided an image capturing device 110 for detecting fog in a scene imaged using the image capturing device 110. Again, the memory 502 contains the instructions executable by said processing circuit 504 whereby the image capturing device 110 is operative for:

capturing a first image of the scene without illuminating the scene with IR radiation, determining a first value of a measure relating to contrast for the first image, when the first value indicates that a first contrast of the first image less than a first threshold value, capturing a second image of the scene while illuminating the scene with IR radiation, determining a second value of the measure relating to contrast for the second image, when a difference between the first contrast and a second contrast, indicated by the second value, is greater than a second threshold value, determining that there is fog in the scene.

FIG. 5 further illustrates a carrier 505, or program carrier, which comprises the computer program 503 as described above. The carrier 505 may be one of an electronic signal, an optical signal, a radio signal and a computer readable medium.

In some embodiments, the image capturing device 110 and/or the processing module 501 may comprise one or more of a capturing module 510, and a determining module 520 as exemplifying hardware modules. In other examples, one or more of the aforementioned exemplifying hardware modules may be implemented as one or more software modules.

Moreover, the image capturing device 110 and/or the processing module 501 comprises an Input/Output unit 506, which may be exemplified by a receiving module and/or a sending module when applicable.

Furthermore, the image capturing device 110 may comprise an image sensor 507.

The image processing device 110 may further comprise an IR-cut filter 508.

Additionally, the image processing device 110 may further comprise an IR radiation source 509.

Accordingly, the image capturing device 110 is configured for for detecting fog in a scene imaged using the image capturing device 110.

Therefore, according to the various embodiments described above, the image capturing device 110 and/or the processing module 501 and/or the capturing module 510 is configured for capturing a first image of the scene without illuminating the scene with IR radiation.

The image capturing device 110 and/or the processing module 501 and/or the determining module 520, or a further determining module (not shown), is configured for determining a first value of a measure relating to contrast for the first image.

Moreover, the image capturing device 110 and/or the processing module 501 and/or the capturing module 510 is configured for capturing a second image of the scene while illuminating the scene with IR radiation, when the first value indicates that a first contrast of the first image less than a first threshold value.

The image capturing device 110 and/or the processing module 501 and/or the determining module 520, or a yet further determining module (not shown), is configured for determining a second value of the measure relating to contrast for the second image.

Furthermore, the image capturing device 110 and/or the processing module 501 and/or the determining module 520, or a still further determining module (not shown), is configured for determining that there is fog in the scene, when a difference between the first contrast and a second contrast, indicated by the second value, is greater than a second threshold value.

The first threshold value may indicate a contrast at which the first image is suspected to be compromised by fog.

The second threshold value may indicate difference in contrast expected due to IR radiation.

As mentioned, the image capturing device 110 may comprise an image sensor 507 for capturing images.

The image capturing device 110 may comprise an IR-cut filter 508 for cutting IR radiation, wherein the IR-cut filter 508 may be movable between a first position and a second position, wherein IR radiation may be prevented from reaching the image sensor 507 when the IR-cut filter 508 is in the first position, and wherein IR radiation may be allowed to fall onto the image sensor 507 when the IR-cut filter 508 is in the second position.

The image capturing device 110 and/or the processing module 501 and/or the capturing module 510 may be configured for capturing the first image with the IR-cut filter 508 in the first position, and/or for capturing the second image with the IR-cut filter 508 in the second position.

As mentioned, the image capturing device 110 may comprise an IR radiation source 509 for emitting IR radiation, wherein the image capturing device 110 and/or the processing module 501 and/or the capturing module 510 may be configured to switch off the IR radiation source 509 during capturing of the first image and to switch on the IR radiation source 509 during capturing of the second image.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software function, a software engine, an executable binary software file or the like.

The terms "processing module" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image capturing device, for detecting fog in a scene imaged using the image capturing device, wherein the image capturing device comprises an IR radiation source for emitting IR radiation, wherein the method comprises:
capturing a first image of the scene with the IR radiation source being switched off,
determining a first value of a measure relating to contrast for the first image, the method being characterized by:
when the first value indicates that a first contrast of the first image less than a first threshold value, capturing a second image of the scene while illuminating the scene with IR radiation,
determining a second value of the measure relating to contrast for the second image,
when a difference between the first contrast and a second contrast, indicated by the second value, is greater than a second threshold value, determining that there is fog in the scene.

2. The method according to claim 1, wherein the image capturing device comprises an image sensor for capturing images.

3. The method according to claim 2, wherein the image capturing device comprises an IR-cut filter for cutting IR radiation, wherein the IR-cut filter is movable between a first position and a second position, wherein IR radiation is prevented from reaching the image sensor when the IR-cut filter is in the first position, and wherein IR radiation is allowed to fall onto the image sensor when the IR-cut filter is in the second position.

4. The method according to claim 3, wherein the capturing of the first image is performed with the IR-cut filter in the first position, and wherein the capturing of the second image is performed with the IR-cut filter in the second position.

5. The method according to claim 1, wherein the image capturing device comprises an IR radiation source for emitting IR radiation, wherein the IR radiation source is switched off during the capturing of the first image and wherein the IR radiation source is switched on during the capturing of the second image.

6. An image capturing device configured for performing a method according to claim 1.

7. A non-transitory computer readable medium, comprising computer readable code units which when executed on an image capturing device causes the image capturing device to perform the method according to claim 1.

* * * * *